US009113717B2

(12) United States Patent
Edwards

(10) Patent No.: US 9,113,717 B2
(45) Date of Patent: Aug. 25, 2015

(54) SEATING ATTACHMENT FOR A VEHICLE TRAILER HITCH

(71) Applicant: Randal Gene Edwards, Quanah, TX (US)

(72) Inventor: Randal Gene Edwards, Quanah, TX (US)

( * ) Notice: Subject to any disclaimer, the term of this patent is extended or adjusted under 35 U.S.C. 154(b) by 0 days.

(21) Appl. No.: 14/223,792

(22) Filed: Mar. 24, 2014

(65) Prior Publication Data

US 2014/0284971 A1   Sep. 25, 2014

Related U.S. Application Data

(60) Provisional application No. 61/804,973, filed on Mar. 25, 2013.

(51) Int. Cl.
*A47B 83/02* (2006.01)
*A47C 7/66* (2006.01)
*A47C 15/00* (2006.01)
*A47C 17/80* (2006.01)

(52) U.S. Cl.
CPC . *A47C 7/66* (2013.01); *A47B 83/02* (2013.01); *A47C 15/004* (2013.01); *A47C 17/80* (2013.01)

(58) Field of Classification Search
CPC ........ A47B 83/02; A47C 15/004; A47C 7/66; A47C 17/80

USPC .......................... 297/249, 157.1, 170; 108/44
See application file for complete search history.

(56) References Cited

U.S. PATENT DOCUMENTS

| 3,494,662 | A | * | 2/1970 | Anderson et al. | ............. 297/248 |
| 5,857,741 | A | | 1/1999 | Anderson | |
| 6,082,269 | A | | 7/2000 | Padberg | |
| 6,189,458 | B1 | * | 2/2001 | Rivera | ............. 108/44 |
| 6,314,891 | B1 | | 11/2001 | Larson | |
| 6,808,231 | B1 | | 10/2004 | Hill | |
| 8,616,630 | B1 | | 12/2013 | Midkiff | |
| 2006/0162622 | A1 | * | 7/2006 | Fisher | ............. 108/44 |
| 2010/0059093 | A1 | * | 3/2010 | Clark et al. | ............. 135/16 |
| 2012/0266786 | A1 | * | 10/2012 | Wyman | ............. 108/44 |

* cited by examiner

*Primary Examiner* — Milton Nelson, Jr.
(74) *Attorney, Agent, or Firm* — Robert Gray; The Gray Law Group, Ltd.

(57) ABSTRACT

A seating attachment for a vehicle trailer hitch features two metal bars, the main shaft and the cross member, each with a square cross section and capable of fitting into a standard vehicle trailer hitch mount. The main shaft and cross member are welded together in a "T" configuration. At the ends of the cross member, two seats mounted; the seats may optionally be positioned to face directly backward or be angled inward to face one another. Swivel-mounted seats are also contemplated. Additional mounting points are provided for a table top, an umbrella, beverage coolers, or other equipment. The height of the seats may be raised or lowered relative to the trailer hitch height by an angle piece in order to reach a comfortable sitting level.

19 Claims, 3 Drawing Sheets

SEATING ATTACHMENT FOR A VEHICLE TRAILER HITCH

CROSS-REFERENCE TO RELATED APPLICATIONS

This Application claims priority to U.S. Provisional Application No. 61/804,973, filed Mar. 25, 2013, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to vehicle trailer hitch attachments and in particular to a seating attachment for a vehicle trailer hitch. Sports fans and others attending outdoor events frequently participate in the practice of conducting an impromptu outdoor gathering before the event. This practice is known as "tailgating" or "tailgate partying", since it frequently involves the use of a pickup truck's tailgate. Attendees frequently find seating at tailgate parties to be limited; the ground is often muddy, wet or dirty. A vehicle trailer hitch attachment that provides seating, as well as space for additional items such as a cooler, a table surface or an umbrella, would address this need.

SUMMARY OF THE INVENTION

Accordingly, the invention is directed to a seating attachment for a vehicle trailer hitch. The device features two metal bars, the main shaft and the cross member, each with a square cross section and capable of fitting into a standard vehicle trailer hitch mount. The main shaft and cross member are welded together in a "T" configuration. At the ends of the cross member, two seats mounted; the seats may optionally be positioned to face directly backward or be angled inward to face one another. Swivel-mounted seats are also contemplated. Additional mounting points are provided for a table top, an umbrella, beverage coolers, or other equipment. The height of the seats may be raised or lowered relative to the trailer hitch height by an angle piece in order to reach a comfortable sitting level.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate the invention and, together with the description, serve to explain the principles of the invention.

DETAILED DESCRIPTION OF THE INVENTION

Figure 1:
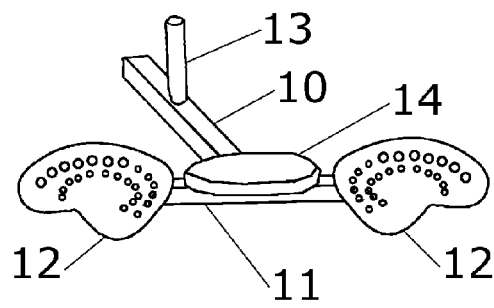
FIG. 1 shows a perspective view of the first exemplary embodiment and displays the main shaft 10, the cross member 11, two seats 12, the pole socket 13, and the table top 14.
Figure 2:
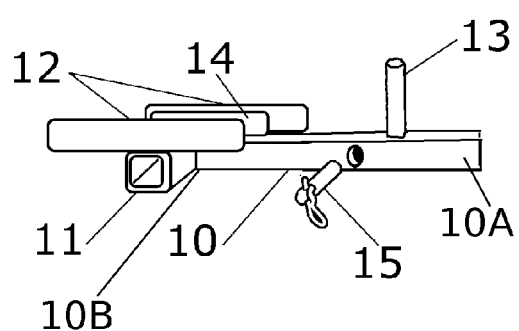
FIG. 2 shows a perspective side view of the first exemplary embodiment and displays the main shaft 10, the cross member 11, the pole socket 13, the lock pin 15, the main shaft first end 10A, and the main shaft second end 10B.
Figure 3:
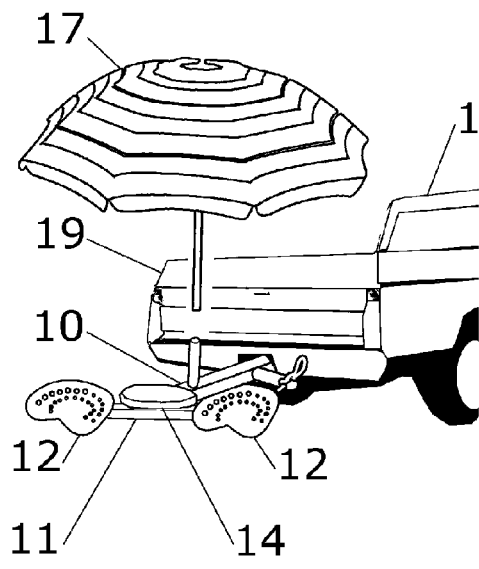
FIG. 3 shows a perspective view of the first exemplary embodiment mounted on a pickup truck with the tailgate closed, and displays the main shaft 10, the cross member 11, two seats 12, the table top 14, the umbrella 17, the pickup truck 18, and the tailgate 19.

Referring now to the invention in more detail, the invention is directed to a seating attachment for a vehicle trailer hitch. The device features two metal bars, the main shaft 10 and the cross member 11, each preferably with a square cross section and capable of fitting into a standard vehicle trailer hitch mount. A hitch lock pin 15 or other hitch-compatible structure is located at the first end of the main shaft 10A. The type of hitch mount contemplated is the square tube type, though the invention may be adapted for other types of hitch mounts. The main shaft 10 and cross member 11 are welded together in a "T" configuration with the cross member 11 located near the main shaft second end 10B. At the ends of the cross member, two seats 12 are mounted; the seats 12 may be mounted to face directly back from the vehicle or inward towards one another. Optionally, the seats 12 may be swivel-mounted so as to permit a range of seating positions and angles. Additional mounting points are provided for a table top 14, an umbrella 17, beverage coolers, or other equipment. The height of the seats 12 may be raised or lowered relative to the trailer hitch height by an angle piece 700, which would be integral to the main shaft 10 or be a separate adapter to accept the main shaft 10 and be inserted into the hitch mount. This would permit the seats to be located at a comfortable sitting level, depending upon the particular vehicle's hitch height. The angle piece 700, whether integral or an attachment, may be generically understood as, if present, causing the main shaft 10 to be not straight, but shaped to have a central vertical jog upward or downward.

Figure 4:
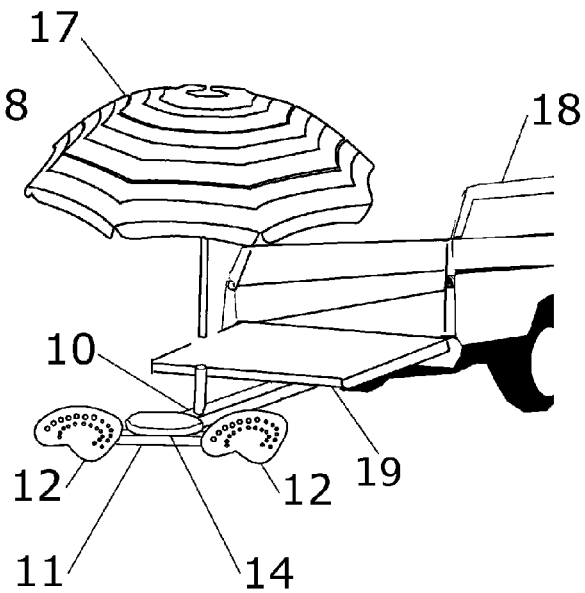
FIG. 4 shows a perspective view of the first exemplary embodiment mounted on a pickup truck with the tailgate opened, and displays the main shaft 10, the cross member 11, two seats 12, the table top 14, the umbrella 17, the pickup truck 18, and the tailgate 19.
Figure 5:
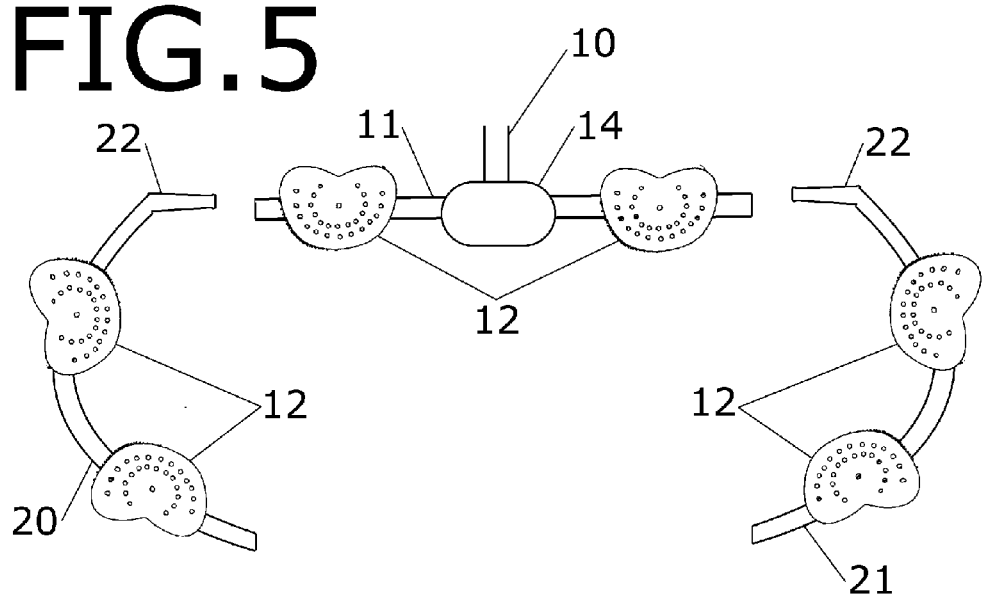
FIG. 5 shows a top view of the first exemplary embodiment with two seating attachments, and displays the main shaft 10, the cross member 11, six seats 12, the table top 14, the left side seating attachment bar 20, the right side seating attachment bar 21, and the two tongues 22.
Figure 6:
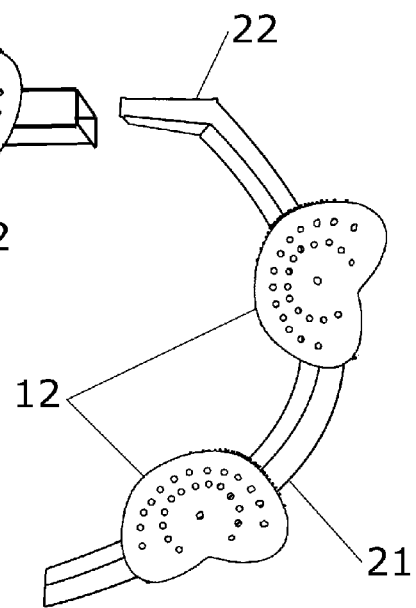
FIG. 6 shows a top view of a portion of the first exemplary embodiment with one seating attachment, and displays the cross member 11, three seats 12, and the right side seating attachment bar 21, and the tongue 22.
Figure 7:
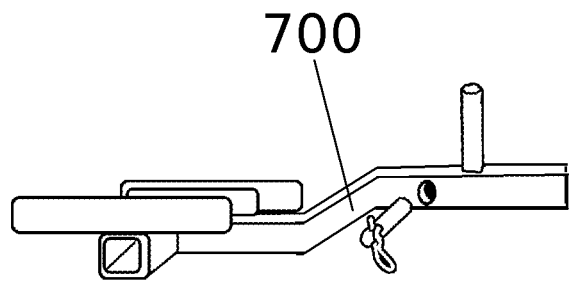
FIG. 7 shows a perspective side view of the first exemplary embodiment as in FIG. 2 with the angle piece 700 present in an upward configuration.
Figure 8:
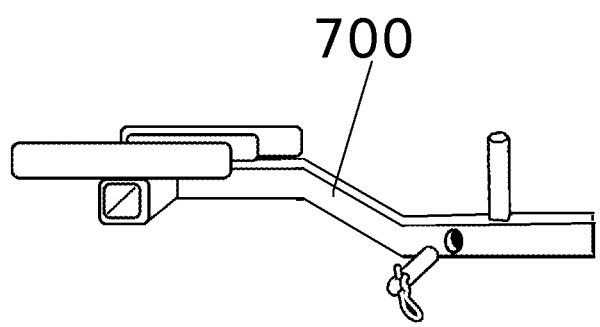
FIG. 8 shows a perspective side view of the first exemplary embodiment as in FIG. 2 with the angle piece 700 present in a downward configuration.

To install the device, the user removes the trailer hitch from the vehicle, then removes the lock pin 15 from the device. The user then slides the main shaft 10 into the vehicle's trailer hitch mount to the desired depth, until the lock pin holes on the trailer hitch mount are lined up with any of a plurality of sets of lock pin holes on the main shaft 10. The user then inserts the lock pin 15 through the lock pin holes of both the trailer hitch mount and the main shaft 10, and locks it into position with the Cotter pin provided. Various attachments, such as coolers, a table top 14, or an umbrella 17 are then attached to the device as desired. Several pairs of lock pin holes are drilled into the main shaft 10, so that it may be inserted into the trailer hitch mount to various depths as desired. When the main shaft 10 penetrates deeply, it may interfere with the space normally reserved for an under-chassis spare tire. For trucks where the spare tire is mounted under the chassis, an embodiment having a shortened man shaft 10 may be provided. When used on a vehicle with a tailgate 19, the main shaft 10 may be extended farther out from the trailer hitch mount, enabling the user to open the tailgate 19 and use it as additional seating or table space, shown in FIG. 4.

The first exemplary embodiment is equipped with two seats 12, and features a pole socket 13 for an umbrella 17 to be inserted. It also features a socket between the seats 12 for a table top 14 to be inserted; a table top may also be permanently affixed to the cross member 11, for example by welding. A left side seating attachment bar 20 and a right side seating attachment bar 21 can be attached to either exemplary embodiment to provide additional seating. Each seating attachment bar is attached by inserting the tongue 22 into the end of the cross member 11. The main shaft 10 of each embodiment is preferably sixty inches long. A shorter main shaft, thirty-six inches long, is also contemplated. The cross member 11 is preferably sixty inches long. Each seating attachment bar is preferably forty-four inches long.

Standard, off-the shelf materials and components, such as tractor seats, are used wherever possible to reduce costs. The main shaft 10, cross member 11, pole socket 13, lock pin 15, left side seating attachment bar 20, right side seating attachment bar 21, and tongues 22 are preferably manufactured from a rigid, durable metal with substantial shear strength, such as steel or aluminum. The table top 14 is preferably manufactured from a rigid, durable material with an easily cleaned surface, such as steel, aluminum, wood, fiberglass, or high-impact plastic. The umbrella 17 features a pole that is preferably manufactured from a rigid, durable material with high shear strength, such as steel, aluminum or wood, and a canopy that is preferably manufactured from a flexible, durable material such as plastic or sailcloth.

Components, component sizes, and materials listed above are preferable, but artisans will recognize that alternative components, or different materials, could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A seating attachment for a vehicle trailer hitch, comprising:
    (a) a main shaft having a first end and a second end;
    (b) said main shaft being configured to be releasably engageable with a vehicle trailer hitch at said first end of said main shaft;
    (c) a cross member;
    (d) said cross member being affixed to said main shaft near said second end of said main shaft such that said cross member is oriented perpendicularly to said main shaft and in a horizontal plane;
    (e) a first pair of seats;
    (f) a tabletop;
    (g) said tabletop being affixed, centrally, to the top of said cross member;
    (h) each of said first pair of seats being affixed, distally, and opposite the other to the top surface of said cross member;
    (i) a left seating attachment bar;
    (j) a right seating attachment bar;
    (k) said left seating attachment bar and said right seating attachment bar, being configured to releasably engage with opposing ends of said cross member, and the ends of said cross member being configured to releasably receive said left seating attachment bar and said right seating attachment bar;
    (l) said left seating attachment bar and said right seating attachment bar being each being shaped in a curve opposing the other;
    (m) a pair of pluralities of additional seats; and
    (o) one of said pair of pluralities of additional seats being affixed to the top of said left attachment bar and the other of said pluralities of additional seats being affixed to the top of said right attachment bar.

2. The seating attachment for a vehicle trailer hitch of claim 1 wherein said main shaft is not straight, but instead is shaped to have a central vertical jog upward or downward, whereby said first end of said main shaft and said second end of said main shaft are vertically offset.

3. The seating attachment for a vehicle trailer hitch of claim 1 wherein said main shaft is elongated and is configured to be releasably engageable to said vehicle trailer hitch at multiple lengths, whereby said main shaft may be extended distally from said vehicle trailer hitch during use, or inserted deeply into said vehicle trailer hitch during storage or movement.

4. The seating attachment for a vehicle trailer hitch of claim 3 wherein said main shaft is not straight, but instead is shaped to have a central vertical jog upward or downward, whereby said first end of said main shaft and said second end of said main shaft are vertically offset.

5. The seating attachment for a vehicle trailer hitch of claim 1 wherein said main shaft is reduced in length, whereby said main shaft will not interfere with an under-chassis mounted spare tire located behind said vehicle trailer hitch.

6. The seating attachment for a vehicle trailer hitch of claim 5 wherein said main shaft is not straight, but instead is shaped to have a central vertical jog upward or downward, whereby said first end of said main shaft and said second end of said main shaft are vertically offset.

7. The seating attachment for a vehicle trailer hitch of claim 1 wherein each of said pluralities of additional seats are two in number.

8. The seating attachment for a vehicle trailer hitch of claim 7 wherein said main shaft is elongated and is configured to be releasably engageable to said vehicle trailer hitch at multiple lengths, whereby said main shaft may be extended distally from said vehicle trailer hitch during use, or inserted deeply into said vehicle trailer hitch during storage or movement.

9. The seating attachment for a vehicle trailer hitch of claim 7 wherein said main shaft is not straight, but instead is shaped to have a central vertical jog upward or downward, whereby said first end of said main shaft and said second end of said main shaft are vertically offset.

10. The seating attachment for a vehicle trailer hitch of claim 7 wherein said main shaft is reduced in length, whereby said main shaft will not interfere with an under-chassis mounted spare tire located behind said vehicle trailer hitch.

11. The seating attachment for a vehicle trailer hitch of claim 1 further comprising a pole socket, said pole socket being affixed to the top of said main shaft.

12. The seating attachment for a vehicle trailer hitch of claim 11 further comprising an umbrella, said umbrella being releasably engageable with said pole socket.

13. The seating attachment for a vehicle trailer hitch of claim 12 wherein said main shaft is elongated and is configured to be releasably engageable to said vehicle trailer hitch at multiple lengths, whereby said main shaft may be extended distally from said vehicle trailer hitch during use, or inserted deeply into said vehicle trailer hitch during storage or movement.

14. The seating attachment for a vehicle trailer hitch of claim 12 wherein said main shaft is reduced in length, whereby said main shaft will not interfere with an under-chassis mounted spare tire located behind said vehicle trailer hitch.

15. The seating attachment for a vehicle trailer hitch of claim 12 wherein said main shaft is not straight, but instead is shaped to have a central vertical jog upward or downward, whereby said first end of said main shaft and said second end of said main shaft are vertically offset.

16. The seating attachment for a vehicle trailer hitch of claim 15 wherein said main shaft is elongated and is configured to be releasably engageable to said vehicle trailer hitch at multiple lengths, whereby said main shaft may be extended distally from said vehicle trailer hitch during use, or inserted deeply into said vehicle trailer hitch during storage or movement.

17. The seating attachment for a vehicle trailer hitch of claim 15 wherein said main shaft is reduced in length, whereby said main shaft will not interfere with an under-chassis mounted spare tire located behind said vehicle trailer hitch.

18. The seating attachment for a vehicle trailer hitch of claim 17 wherein each of said pluralities of additional seats are two in number.

19. The seating attachment for a vehicle trailer hitch of claim 18 wherein each of said pluralities of additional seats are two in number.

* * * * *